May 15, 1923.

P. STERCKLEN

METAL WORKING MACHINE AND ATTACHMENT THEREFOR

Filed Nov. 11, 1920

1,455,554

Inventor
Prosper Stercklen
By his Attorney
Morris Hirsch.

Patented May 15, 1923.

1,455,554

UNITED STATES PATENT OFFICE.

PROSPER STERCKLEN, OF FRANKFORT-ON-THE-MAIN, GERMANY, ASSIGNOR TO GEORGE FUSSNER, OF MENOMINEE, MICHIGAN.

METAL-WORKING MACHINE AND ATTACHMENT THEREFOR.

Application filed November 11, 1920. Serial No. 423,477.

*To all whom it may concern:*

Be it known that I, PROSPER STERCKLEN, a citizen of the German Republic, residing at Frankfort-on-the-Main, Germany, have invented certain new and useful Improvements in Metal-Working Machines and Attachments Therefor, of which the following is a specification.

This invention relates primarily to means for cutting metal stock to predetermined lengths, although the invention is also adapted for performing any of a variety of machining operations at predetermined points along the length of a piece of stock.

An object of the invention is to provide an attachment of simple construction for a lathe or similar machine which may be easily applied, for expeditiously and accurately carrying out the purpose referred to.

A feature of the invention is the provision of a stop member, preferably in the form of a rod, to be secured preferably in the head stock of a lathe for forming an abutment to assist in quickly positioning the work so that the tool on the lathe will perform its operation at an accurately predetermined part of the length of the work. In the preferred embodiment the stop member or attachment is arranged to be readily adjustable in position to adapt it to sever stock to any desired length.

The invention has its preferred application to hollow spindle lathes and in this application the rod of the attachment is preferably inserted into the spindle from the rear end of the head stock, appropriate means being provided, preferably operable from the rear end of the head stock, for firmly securing the rod within the spindle in any desired position of adjustment.

For operation upon shorter pieces of stock, the stop may be arranged in a generally similar manner within the chuck, rather than within the spindle.

In a preferred embodiment of the invention, the means for securing the stop rod in any position of adjustment comprises a compound gripping member interposed between the rod and the hollow member within which it is to be supported, operating means being provided preferably for concurrently gripping both the rod and the hollow member.

In the accompanying drawings, in which are shown one or more embodiments of the several features of the invention.

Figure 4:
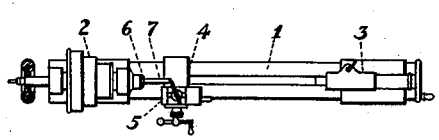
Fig. 4 is a diagrammatic fragmentary top view of a lathe on a small scale, illustrating the use of my attachment.

Referring now to the drawings, I have shown in Fig. 4 a metal working lathe having a base 1, a head stock 2, a tail stock 3 and a compound slide rest 4 having the cross-slide 5 usual on lathes. A common form of expansible chuck is shown at 6 in the head stock for mounting the work, indicated at 7.

Figure 1:
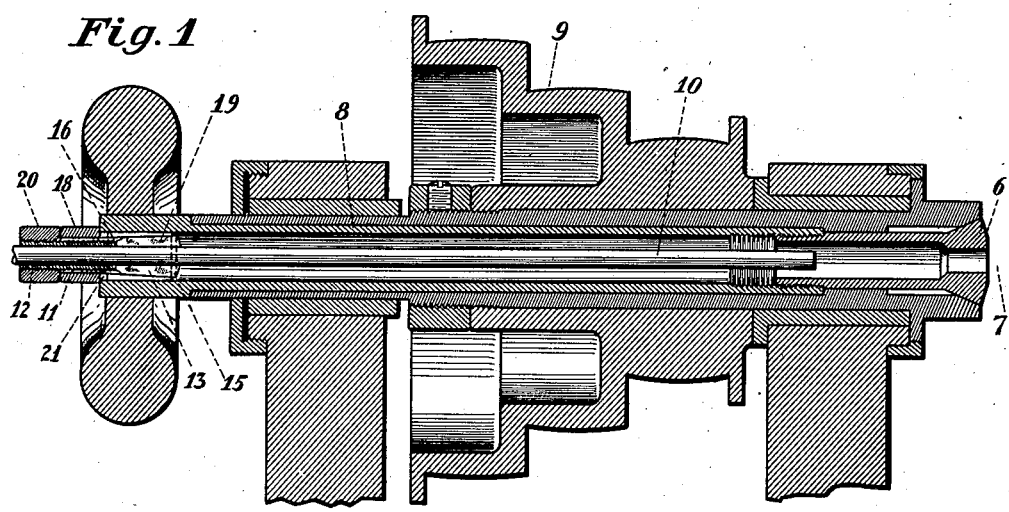
Fig. 1 shows a view in longitudinal section of a lathe with my attachment applied thereto.

The head stock is shown on a larger scale in Fig. 1 and includes the usual hollow spindle 8 and the cone 9, the chuck and the work held thereby being designated by the same reference numerals 6 and 7 respectively as in Fig. 4.

My attachment comprises preferably a cylindrical rod 10 of a diameter materially smaller than the bore of spindle 8. Rod 10 is surrounded by an inner sleeve 11 threaded for a substantial part of its length at one end, as at 12 and smooth or unthreaded at the other end as at 13. The latter part is conical with the largest diameter at the extreme end as at 14. The conical end 14 is slitted longitudinally as at 15 to provide a resilient gripping wedging cone construction as will appear more fully below. Surrounding the sleeve 11 is an outer and unthreaded sleeve 16. The latter sleeve is of relatively thin metal, slitted longitudinally from one end as at 17 for resiliency, the opposite end having a knurled head or manual grip portion 18. The sleeve 16 is telescoped over sleeve 11 with knurled head 18 adjacent the threaded portion 12 and the slit sleeve portion extending toward the unthreaded end and embracing the slit conical portion 14. By preference the inner surface of the sleeve 16 is constructed to taper outwardly slightly toward its free end as at 19.

Cooperating with the threaded end 12 of the sleeve 11 is a nut 20 for a purpose rendered clear below.

In the application of the device, the rod 10 is inserted through the rear end of the spindle to the desired extent, with the gripping sleeves 11 and 16 surrounding the same, the latter sleeve encircling the former. The knurled head 18 is now brought into contact with the rear surface of the hollow spindle as at 21. Thereupon the nut 20 is tightened. As the knurled head 18 is prevented from moving longitudinally by reason of its contact with the head stock, the turning of the nut will cause the inner sleeve 11 to be drawn toward the left or rearwardly therethrough. As the portion of the split cone 14 that contacts the split end 17 of the outer sleeve 16 thus gradually increases in diameter, being in effect wedged into the outer sleeve, the latter is caused to spread into intimate gripping contact with the bore of the hollow spindle 8. The reaction of the bore of the spindle through sleeve 16 upon the split conical end 14 of the inner sleeve will at the same time force the latter into firm gripping engagement with the rod 10. Thus, by the simple process of turning the nut 20 I effect concurrently an expansion of the outer sleeve to grip the bore of the hollow spindle and a contraction of the inner sleeve to grip the rod, thereby firmly securing the stop rod within the spindle. My attachment thus embodies a compound gripping member which by a single operation is caused to tightly embrace the rod and to tightly expand into the bore of the spindle, thereby gripping the rod and the spindle simultaneously.

It will be seen that the compound gripping member provides a secure hold for the stop rod, the efficacy of which is in no way dependent upon the accuracy of dimensions of the spindle bore. The outer sleeve expands to an extent sufficient to grip the bore of the spindle and the inner sleeve is correspondingly contracted to grip the rod, regardless of the tolerances in the manufacture of these parts.

The preferred manner of using my attachment for accurately cutting off lengths of stock in quantity production is to secure the attachment within the spindle in the manner already set forth, to place a gauge piece of the length to which parts are to be cut into contact with the forward end of the stop rod to draw the compound slide rest to such position that the tool will come into contact with the end of the gauge piece and thereupon to clamp the compound slide in such position. It will then be apparent that any piece of stock secured in position within the chuck and in end-to-end engagement with the stop rod will be cut off to accurate length by operation of the cross slide upon the slide rest. Thus, by adjusting the lathe with my stop attachment in the manner outlined, a continuous supply of pieces of stock previously cut off to somewhat greater length than that desired, can accurately and expeditiously be reduced to the length required. In this operation the tail stock is not employed.

To remove the attachment from the lathe, the nut 20 is first loosened and then pressed toward the head stock, thereby releasing the inner or wedging cone 14 from the encircling split sleeve 17. The entire attachment can now be removed as a unit by grasping the knurled head 18 and drawing it outwardly.

It is, of course, apparent that although the exterior surface of the inner sleeve and the cooperating interior surface of the outer sleeve are both shown conical in form, either of said surfaces alone may be made of conical shape, the other being formed cylindrical, but it will be understood that I prefer the specific construction shown and described.

Figure 2:
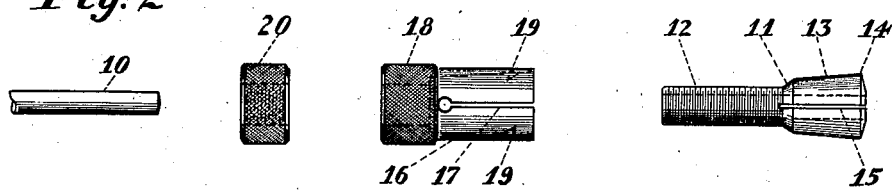
Fig. 2 is a detail view of the various parts of my attachment disassembled.
Figure 3:
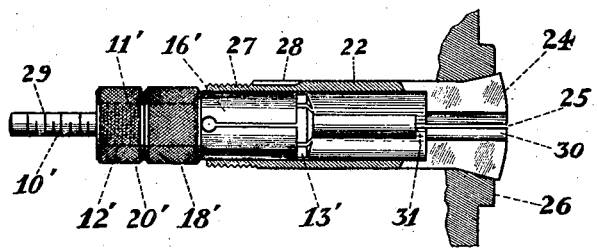
Fig. 3 is a view partly in longitudinal section and partly in elevation of my attachment applied to a chuck.

For operation upon short pieces, it is desirable to mount the attachment in the chuck in the manner shown in Fig. 3 rather than in the hollow spindle. For such application I employ the same assembly as in Fig. 2 but on a smaller scale, comprising stop rod 10', inner sleeve 11' threaded at one end as at 12' and smooth and conical at the other as at 13', an outer expansible sleeve 16' having a knurled head 18' and a tightening nut 20' threaded upon thread 12'.

The chuck 22 is shown as of the ordinary taper collet type, comprising a flaring end 24 for fitting into a corresponding taper socket 26 in the hollow spindle of a lathe or other machine, a fragment of the spindle only being shown. The chuck as usual is split as at 25 and threaded at the end opposite the flare 24 as at 27, and has a keyway 28 adjacent said threaded end. It will be understood that the threaded end 27 is threaded in the usual manner into a corresponding threaded end (not shown) of the draw spindle of a lathe, a key (not shown) in the hollow spindle cooperating with keyway 28, so that rotation of the draw spindle will draw chuck 22 inwardly to tighten the flaring end 24 about the piece of work (not shown) which is gripped by the chuck at 30. The stop attachment sleeve 16' grips the interior of chuck 22 in the same manner as the corresponding element grips the hollow spindle of the lathe in Fig. 1. It will be understood that in operation the stop rod 10' is inserted to the extent required, and the piece of stock to be operated upon is inserted in the chuck to an extent such that its end contacts the adjacent end 31 of said stop rod.

The rear end of the rod 10' in Fig. 3 is shown provided with scale divisions 29 to facilitate rapid setting of the rod to approximately correct position. Similar scale divisions may and preferably are also provided on the rod of the attachment to be applied to the hollow spindle as in Fig. 1. Although the invention has its preferred use for cutting off pieces to an accurate length, it will be understood that the stop is useful in performing any machining operations upon pieces of stock where such operation must be performed at a particular part or parts of the lengths thereof. For instance, if a shoulder is to be cut at a definite distance from the end of the stock, my stop attachment would act to position the work, the tail stock being preferably used to hold the end opposite the stop. An appropriate cutting tool upon the cross slide will then perform the operation at the place desired and the accurate insertion of the work for quantity production is quickly effected.

It will be seen that I have provided a simple attachment adapted for ready application particularly to hollow spindle lathes of conventional or standard construction, and especially useful to render possible the cutting of pieces of stock to accurate lengths with the speed requisite in quantity production. The attachment being adjusted in position, the operation of cutting stock to accurate lengths or performing other machining operations at definite points along the length is carried out without the need for any measurements or observations of scales. The stop accurately limits the extent to which the stock can be inserted into the chuck and, thereby, automatically and accurately assures correct position with respect to the tool.

My attachment, when embodied in a lathe thus renders practicable the performances of operations to which lathes not provided therewith are not adapted, and I desire to claim not only the attachment per se, but the combination of the machine or lathe with the attachment embodied therein, as a part thereof. In this connection it is to be understood that the attachment although preferably in the form of a separate unit to be applied to the lathe may, if desired, be installed in the lathe in the manufacture thereof and as a permanent preferably, adjustable fixture therein. It is, of course, obvious that the attachment may be applied to machines other than lathes, such as screw machines and milling machines of the type provided with hollow spindles, and that the attachment to be applied to the chuck can be used in any machine to which chucks of the general type set forth are applicable.

The compound gripping member although it has its preferred application to securing a stop rod within a hollow member such as the hollow spindle of a lathe or within a chuck, is of general application broadly in any relation where two coaxial members one extending within the other are to be secured together either in permanently fixed or readily adjustable relation.

I claim:—

1. An adjustable stop for metal working machines comprising in combination, a stop rod, and expansible clamping means surrounding said rod for firmly gripping the exterior of the rod at any part of the length thereof and adapted to grip the interior of a hollow element upon a lathe for mounting said rod into operative position.

2. An adjustable stop for metal working machines, comprising in combination, a stop rod and a compound gripping member surrounding said rod and constructed and arranged to be set for firmly gripping the exterior of the rod at any part of the length thereof and for gripping the interior of a hollow element upon the machine for the purpose of mounting said stop into operative position.

3. An adjustable stop for metal working machines, comprising in combination, a stop rod, a compound gripping member surrounding said rod, and a single operating member for causing concurrently a contraction of the radially innermost surface of said gripping member to grip said rod, and an expansion of the radially outermost surface thereof for the purpose of gripping the interior of a hollow element upon the machine.

4. An adjustable stop for metal working machines comprising in combination, a stop rod, a compound gripping member comprising a gripping sleeve to surround said rod, a second gripping sleeve to surround said first sleeve, one of said sleeves having a conical form at the surface to contact the other, and means for telescoping said sleeves to cause a contraction of the inner sleeve for gripping said rod, and an expansion of the outer sleeve for gripping the interior of a hollow element upon the machine.

5. An adjustable stop for metal working machines, comprising in combination, a stop rod, a compound gripping member comprising a compressible conical sleeve surrounding said rod, and an expansible sleeve surrounding said conical sleeve, one of said sleeves having a threaded extension and a nut upon said extension for concurrently causing expansion of the outer sleeve to grip the interior of a hollow element of the machine and contraction of the inner sleeve for gripping said rod.

6. An adjustable stop for metal working machines comprising in combination, a stop rod, a compound gripping member comprising a slitted conical sleeve surrounding said rod, a slitted expansible sleeve surrounding said conical sleeve with its slitted end adjacent the wider end of the conical sleeve, and means for drawing said expansible sleeve along said conical sleeve to cause the latter to contract for gripping said rod and the former to expand for gripping a hollow element upon the machine.

7. An adjustable stop for metal working machines, comprising in combination, a stop rod, a compound gripping member comprising a threaded sleeve surrounding said rod and having an unthreaded slitted conical end, an expansible sleeve surrounding said first sleeve with a slitted end adjacent the unthreaded end of said first sleeve, and a nut cooperating with the threaded end of said first sleeve for causing said expansible sleeve to move along said first sleeve to tighten the latter upon said rod, and concurrently to tighten the expansible sleeve against the interior of a hollow element on said machine.

8. An adjustable stop for metal working machines comprising in combination, a stop rod, a compound gripping member comprising an inner sleeve surrounding said rod having a threaded portion and a split conical unthreaded end, an outer split sleeve encircling said first sleeve and having a knurled head, the split end of the outer sleeve being adjacent the extreme unthreaded end of the inner sleeve, and a nut cooperating with said thread upon the inner sleeve.

9. An adjustable stop for metal working machines, comprising in combination, a stop rod, a compound gripping member including a sleeve surrounding said rod having a threaded portion and a split conical unthreaded end, a split, expansible, unthreaded sleeve slightly conical at its inner surface and surrounding the conical end of said first sleeve, and a nut cooperating with said threaded portion.

10. A spring chuck for lathes or the like having embodied therein, a stop rod extending axially thereof, and clamping means surrounding said rod and extending into said chuck and tightening means therefor for effecting firm gripping of the exterior of the rod at any part of the length thereof, and of the interior of said chuck.

11. A spring chuck for lathes or the like having embodied therein, a stop rod, a compound gripping member surrounding said rod and extending into said chuck, and a single operating member for causing concurrently a contraction of the radially innermost surface of said gripping member to grip said rod, and an expansion of the radially outermost surface thereof to grip said chuck.

12. A spring chuck of the type that is flared and slitted at one end and externally threaded at the other and has a keyway adjacent said threaded portion, having embodied therein, a stop rod, a compound gripping member surrounding said rod and extending into said chuck, and a single-operating member for causing concurrently a contraction of the radially innermost surface of said gripping member to grip said rod and an expansion of the radially outermost surface thereof to grip said chuck.

13. A spring chuck having embodied therein, an adjustable stop rod, a compound gripping member surrounding said rod and extending at one end into said chuck, said gripping member comprising an inner sleeve having a threaded portion and a split conical end, an unthreaded outer sleeve surrounding said inner sleeve and having a knurled end adjacent the threaded portion thereof and a split thin metal sleeve surrounding the conical end of said inner sleeve, and a nut cooperating with the threaded end of said inner sleeve for causing concurrently a contraction of the conical end of the inner sleeve to grip said rod and an expansion of the outer sleeve to grip the interior of said chuck.

14. A lathe of the type provided with a head stock having a hollow spindle, a stop rod extending axially of said spindle, gripping means within the bore of said spindle and surrounding said rod, and operating means upon the exterior and at the rear end of said spindle for causing said gripping means to secure said stop rod to said spindle.

15. Means for securing coaxial elements together, comprising a compound gripping member extending between said elements, and including operating means for causing a contraction of one part of said member to grip the inner of the elements, and an expansion of another part of said member to grip the outer of the elements.

16. Means for securing coaxial elements together, comprising a compound gripping member having telescoping sleeves disposed between said elements, one of said sleeves being conical, and a single operating member for causing a telescoping of said sleeves to bring about an expansion of the outer and a contraction of the inner of said sleeves to grip respectively the outer and the inner of the said coaxial elements.

In testimony whereof I have affixed my signature in presence of two witnesses.

PROSPER STERCKLEN.

Witnesses:
  JOHANN OERTH,
  AUGUST HESS.